(12) United States Patent
Briggs et al.

(10) Patent No.: US 10,730,388 B1
(45) Date of Patent: Aug. 4, 2020

(54) IN VEHICLE DRIVER FEEDBACK DEVICE

(71) Applicant: Allstate Insurance Company, Northbrook, IL (US)

(72) Inventors: Ryan M. Briggs, Glen Ellyn, IL (US); Nathan M. Bryer, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 16/390,312

(22) Filed: Apr. 22, 2019

Related U.S. Application Data

(60) Continuation of application No. 16/054,494, filed on Aug. 3, 2018, which is a continuation of application No. 15/414,135, filed on Jan. 24, 2017, now Pat. No. 10,065,505, which is a continuation of application No. 13/935,002, filed on Jul. 3, 2013, now Pat. No.
(Continued)

(51) Int. Cl.
*G06T 15/00* (2011.01)
*B60K 35/00* (2006.01)
*G06T 15/10* (2011.01)
*B60R 11/02* (2006.01)
(Continued)

(52) U.S. Cl.
CPC .......... *B60K 35/00* (2013.01); *B60R 11/0252* (2013.01); *G06T 13/40* (2013.01); *G06T 15/10* (2013.01); *B60K 2370/11* (2019.05); *B60K 2370/589* (2019.05); *B60R 2011/0026* (2013.01); *G06T 2200/24* (2013.01); *G06T 2215/16* (2013.01)

(58) Field of Classification Search
CPC ................ B60K 35/00; B60K 2370/11; B60K 2370/589; B60R 11/0252; B60R 2011/0026; G06T 13/40; G06T 15/10; G06T 2200/24; G06T 2215/16
See application file for complete search history.

(56) References Cited

U.S. PATENT DOCUMENTS 2,833,495 A    5/1958   Feeney et al.
4,198,864 A    4/1980   Breed
(Continued)

FOREIGN PATENT DOCUMENTS

CN           104348953 A    2/2015

OTHER PUBLICATIONS

"Connect Your Mobile Device to Your Vehicle's ELD", date unknown, 3 pp.
(Continued)

*Primary Examiner* — Mussa A Shaawat
(74) *Attorney, Agent, or Firm* — Banner & Witcoff, Ltd.

(57) ABSTRACT

The disclosure relates generally to an in-vehicle feedback system, and more particularly, to an in-vehicle device with a display or graphical interface that collects driving data and provides feedback based on the driving data. The system may comprise an in-vehicle device that includes a graphical user interface and a processor and a data collection device wirelessly connected to the in-vehicle device. The in-vehicle device may be configured to receive vehicle telematics data from the data collection device and the processor may process the telematics data in real time and cause the telematics data to be displayed on the graphical user interface. The graphical user interface may include a speed display and an acceleration display.

22 Claims, 11 Drawing Sheets

Related U.S. Application Data 9,588,735, which is a division of application No. 13/216,849, filed on Aug. 24, 2011, now Pat. No. 9,177,427.

(51) Int. Cl.
*G06T 13/40* (2011.01)
*B60R 11/00* (2006.01)

(56) References Cited

U.S. PATENT DOCUMENTS

| | | | |
|---|---|---|---|
| 4,716,458 | A | 12/1987 | Heitzman et al. |
| 5,517,183 | A | 5/1996 | Bozeman, Jr. |
| 5,719,554 | A | 2/1998 | Gagnon |
| 5,736,970 | A | 4/1998 | Bozeman, Jr. |
| 5,963,128 | A | 10/1999 | McClelland |
| 6,405,112 | B1 | 6/2002 | Rayner |
| 6,539,249 | B1 | 3/2003 | Kadhiresan et al. |
| 6,553,308 | B1 | 4/2003 | Uhlmann et al. |
| 7,006,793 | B2 | 2/2006 | Himmel et al. |
| 7,135,993 | B2 | 11/2006 | Okamoto et al. |
| 7,519,458 | B2 | 4/2009 | Buckley |
| 7,583,401 | B2 | 9/2009 | Lewis |
| 7,650,235 | B2 | 1/2010 | Lee et al. |
| 7,778,752 | B1 | 8/2010 | Hunt et al. |
| 7,872,636 | B1 | 1/2011 | Gopi et al. |
| 8,082,314 | B2 | 12/2011 | Lewis |
| 8,103,292 | B2 | 1/2012 | Kelly et al. |
| 8,204,649 | B2 | 6/2012 | Zhou et al. |
| 8,432,260 | B2 | 4/2013 | Talty et al. |
| 8,527,013 | B2 | 9/2013 | Guba et al. |
| 8,626,144 | B2 | 1/2014 | Talty et al. |
| 8,630,768 | B2 | 1/2014 | McClellan et al. |
| 8,634,788 | B2 | 1/2014 | Wright et al. |
| 8,817,761 | B2 | 8/2014 | Gruberman et al. |
| 8,890,673 | B2 | 11/2014 | Callen et al. |
| 8,903,593 | B1 | 12/2014 | Addepalli et al. |
| 8,918,232 | B2 | 12/2014 | Lavi et al. |
| 8,989,820 | B2 | 3/2015 | Czaja et al. |
| 9,014,911 | B2 | 4/2015 | Ricci |
| 9,083,581 | B1 | 7/2015 | Addepalli et al. |
| 9,105,051 | B2 | 8/2015 | Ricci |
| 9,111,316 | B2 | 8/2015 | Fernandes et al. |
| 9,130,647 | B2 | 9/2015 | Yamold et al. |
| 9,142,142 | B2 | 9/2015 | Nath et al. |
| 9,210,253 | B2 | 12/2015 | Gruberman et al. |
| 9,258,409 | B1 | 2/2016 | Barfield, Jr. et al. |
| 9,275,010 | B2 | 3/2016 | Kote et al. |
| 9,296,299 | B2 | 3/2016 | Ricci |
| 9,302,584 | B2 | 4/2016 | Walsh et al. |
| 9,357,053 | B2 | 5/2016 | Gruberman et al. |
| 9,367,968 | B2 | 6/2016 | Giraud et al. |
| 9,373,200 | B2 | 6/2016 | Warren |
| 9,380,615 | B2 | 6/2016 | Nevarez Pedroza |
| 9,402,174 | B2 | 7/2016 | Greubel |
| 9,560,490 | B2 | 1/2017 | Velusamy |
| 9,564,962 | B2 | 2/2017 | Yamold et al. |
| 9,639,995 | B2 | 5/2017 | Cacabelos et al. |
| 9,773,353 | B2 | 9/2017 | Naamani et al. |
| 9,775,112 | B2 | 9/2017 | Gu |
| 9,796,391 | B2 | 10/2017 | Olson et al. |
| 9,832,241 | B1 | 11/2017 | Hayward |
| 9,848,289 | B2 | 12/2017 | Fischer et al. |
| 9,870,649 | B1 | 1/2018 | Fields et al. |
| 9,881,272 | B2 | 1/2018 | Mitchell et al. |
| 9,892,567 | B2 | 2/2018 | Binion et al. |
| 9,913,099 | B2 | 3/2018 | Watkins et al. |
| 9,955,319 | B2 | 4/2018 | Matus et al. |
| 9,988,058 | B2 | 6/2018 | Phillips |
| 10,296,977 | B2 * | 5/2019 | Chevrette .............. G06Q 40/08 |
| 10,445,758 | B1 * | 10/2019 | Bryer ................ G06Q 30/0207 |
| 2002/0003571 | A1 | 1/2002 | Schofield et al. |
| 2002/0049535 | A1 | 4/2002 | Rigo et al. |
| 2003/0005765 | A1 | 1/2003 | Brudis et al. |
| 2004/0068350 | A1 | 4/2004 | Tomson |
| 2004/0128065 | A1 | 7/2004 | Taylor et al. |
| 2004/0145457 | A1 | 7/2004 | Schofield et al. |
| 2004/0189722 | A1 | 9/2004 | Acres |
| 2005/0104745 | A1 | 5/2005 | Bachelder et al. |
| 2005/0119826 | A1 | 6/2005 | Lee et al. |
| 2006/0025897 | A1 | 2/2006 | Shostak et al. |
| 2006/0055583 | A1 | 3/2006 | Orr et al. |
| 2006/0067573 | A1 | 3/2006 | Parr et al. |
| 2006/0192783 | A1 | 8/2006 | Kass et al. |
| 2007/0027583 | A1 | 2/2007 | Tamir et al. |
| 2008/0078253 | A1 | 4/2008 | Blackwood et al. |
| 2008/0255722 | A1 | 10/2008 | McClellan et al. |
| 2008/0300731 | A1 | 12/2008 | Nakajima et al. |
| 2008/0306636 | A1 | 12/2008 | Caspe-Detzer et al. |
| 2009/0125180 | A1 | 5/2009 | Berkobin et al. |
| 2009/0210078 | A1 | 8/2009 | Crowley |
| 2010/0020170 | A1 | 1/2010 | Higgins-Luthman et al. |
| 2010/0205012 | A1 | 8/2010 | McClellan |
| 2011/0012720 | A1 | 1/2011 | Hirschfeld |
| 2011/0060496 | A1 | 3/2011 | Nielsen et al. |
| 2011/0070864 | A1 | 3/2011 | Karam et al. |
| 2011/0161116 | A1 * | 6/2011 | Peak ..................... G06Q 40/08 705/4 |
| 2011/0307119 | A1 | 12/2011 | Basir et al. |
| 2012/0303392 | A1 * | 11/2012 | Depura ............ H04W 52/0258 705/4 |
| 2013/0297097 | A1 | 11/2013 | Fischer et al. |
| 2014/0139676 | A1 | 5/2014 | Wierich |
| 2014/0244678 | A1 | 8/2014 | Zamer et al. |
| 2015/0019268 | A1 * | 1/2015 | Handel ................. G06Q 40/08 705/4 |
| 2015/0024688 | A1 | 1/2015 | Hrabak et al. |
| 2015/0312655 | A1 | 10/2015 | Balakrishnan et al. |
| 2016/0196613 | A1 * | 7/2016 | Miles .................... G06Q 40/08 705/4 |
| 2016/0358389 | A1 | 12/2016 | Menard et al. |
| 2018/0013873 | A1 * | 1/2018 | Farrell .................... G08G 1/20 |

OTHER PUBLICATIONS

"Sony uses NFC to Link Smartphone and In-car Head Unit", Jan. 22, 2014, URL: http://telematicsnews.info/2014/01/22/sony-uses-nfc-to-link-smartphone-and-in-car-head-unit_j5222/.

Sep. 10, 2013—(US) Non-Final Office Action—U.S. Appl. No. 13/216,849.

Oct. 6, 2014—(US) Non-Final Office Action—U.S. Appl. No. 13/216,849.

Apr. 2, 2015—(US) Non-Final Office Action—U.S. Appl. No. 13/935,002.

Jan. 6, 2016—(US) Final Office Action—U.S. Appl. No. 13/935,002.

Jun. 16, 2016—(US) Non-Final Office Action—U.S. Appl. No. 13/935,002.

Jan. 22, 2018—(US) Non-Final Office Action—U.S. Appl. No. 15/414,135.

Allen Hong, The Linear-Logic ScanGauge II Review, Jun. 10, 2007.

AX22 Performance Computer, Race Technology Ltd. [On-line], Retrieved from the Internet: http://www.race-technology.com.

Bubble Level, 2010 [On-line], Retrieved from the Internet: http://developer.apple.com/library/ios/samplecode/BubbleLevel/Listings/ReadMe_txt.html.

Carl Duzen, et al., Using an Accelerometer to Classify Motion, 2001.

Charles Petzold, Accelerometer and Location Service in Windows Phone 7, Nov. 23, 2010 [On-line], Retrieved from the Internet: http://www.c-sharpcorner.com/UploadFile/8c85cf/4363/.

CS-525H: Immersive Human-Computer Interaction, Oct. 25, 2010, Department of Computer Science, Worcester Polytechnic Institute.

Dash3 Instruction Manual, 2010, Race Technology Limited [On-line], Retrieved from the Internet: http://www.race-technology.com.

Dash4 Pro, 2011 [On-line], Retrieved from the Internet: http://www.race-technology.com/dash4_pro_2_31014.html.

Doug Newcomb, Cool iPhone Car Applications, Nov. 20, 2008 [On-line], Retrieved from the Internet: http://edmunds.com.

(56) References Cited

OTHER PUBLICATIONS

DynoStorm, 2009, BunsenTech, LLC [On-line], Retrieved from the Internet: http://www.bunsentech.com/projects/dynostorm/.

=Fleet Management Features, 2011, RedTail Telematics [On-line], Retrieved from the Internet: http://www.redtailtelematics.com/fleet-management/features/.

GForce, 2011 [On-line], Retrieved from the Internet: http://gadgitech.com/uk/IPhone/Applications/GForce.html.

Giuseppe Ghiani, et al., Multimodal PDA Interfaces to Assist Drivers in Monitoring Their Vehicles, ISTI-CNR.

GMeter, 2008 [On-line], Retrieved from the Internet: http://hunter.pairsite.com/gmeter/.

Harker Innovation Team [On-line], Retrieved from the Internet: http://fuelourfuturenow.discoveryeducation.com/pdfs/dash-plus/Harker_Plan.pdf.

Hurtado Apps, 2011, iPhone/iPod applications [On-line], Retrieved from the Internet: http://apps.hurtado.cl/car/car-details.

HUD an Aerospace inspired spatial motion visualization on the iPhone 3G and 3GS, and iPad [On-line], [attached copy retrieved on Apr. 14, 2011], Retrieved from the Internet: http://www.i-hud.com/.

Insurance, 2011, Webtech Wireless [On-line], Retrieved from the Internet: http://www.wtwmail.com/en/industry_solutions/insurance/.

K.A.T. Matrix 3-Axis Accelerometer (Car Performance Meter), 2011 [On-line], Retrieved from the Internet: http://www.amazon.com.

Race Technology Knowledge Base, 2008 [On-line], Retrieved from the Internet: http://www.race-technology.com/wiki/index.php/AnalysisTools.

Released—GReddy iPhone and iPod App, Jun. 28, 2010, The Octane Report [On-line], Retrieved from the Internet: http://www.octanereport.com.

Rev User Manual, Nov. 9, 2009, DevToaster, LLC [On-line], Retrieved from the Internet: http://www.devtoaster.com.

Solution: Fleet Performance, 2009, Cadec Global Inc. [On-line], Retrieved from the Internet: http://www.cadec.com/solutions/executiveDashboards.php.

Tamura, Toshiya et al., "Device Connectivity Technologies using Short-distance Wireless Communications", Fujitsu Sci. Tech. J., Apr. 2013, vol. 49, No. 2, pp. 213-219.

Vehicle Performance Computer Owner's Manual, 2011. Beltronics [On-line], Retrieved from the Internet: http://www.beltronics.com.

Vehicle productivity, security & safety, 2010, Acadian Companies [On-line], Retrieved from the Internet: http://www.acadian.com/site598.php.

Vitalijs Lennojs, aGile Dashboard, Dec. 19, 2008 [On-line], Retrieved from the Internet: http://phoneapplicationlist.com/app/id300133977/.

Your Resource Highway to driver Safety, 2011, GeoPoint Partners, LLC [On-line], Retrieved from the Internet: http://www.geopointpartners.com/.

Sep. 30, 2019—(US) Non-Final Office Action—U.S. Appl. No. 16/054,494.

Jan. 23, 2020—(US) Notice of Allowance—U.S. Appl. No. 16/054,494.

\* cited by examiner

IN VEHICLE DRIVER FEEDBACK DEVICE

This application is a continuation of U.S. patent application Ser. No. 16/054,494, filed Aug. 3, 2018, which is a continuation of U.S. patent application Ser. No. 15/414,135, filed Jan. 24, 2017, which is a continuation of U.S. patent application Ser. No. 13/935,002 filed Jul. 3, 2013, now U.S. Pat. No. 9,588,735, which issued Mar. 7, 2017, which is a divisional of co-pending U.S. patent application Ser. No. 13/216,849 filed Aug. 24, 2011, now U.S. Pat. No. 9,177,427 which issued Nov. 3, 2015. All of the aforementioned are incorporated by reference herein in their entireties.

TECHNICAL FIELD

The disclosure relates generally to an in-vehicle device, and more particularly, to an in-vehicle device with a display or graphical interface that collects driving data and provides feedback based on the driving data.

BACKGROUND

Vehicle On-Board Diagnostics devices are standard on all modern vehicles. These devices generally provide telematics data for the vehicle operations. Additionally, smart phones or personal communication devices have been widely available from companies such as Research In Motion (RIM). Recent introduction of the iPhone® by Apple Inc. and Android by Google phones have accelerated market penetration of these devices. Smart phones provide a broad range of capabilities, such as large readable displays, the ability to add new applications to the phone, network connectivity via cellular and/or WiFi, and global positioning system (GPS) location determination.

The disclosure relates generally to an in-vehicle device, which utilizes smart phones or personal communication devices and/or vehicle on-board diagnostics devices to collect driving data and provides driving feedback based on the collected driving data.

SUMMARY OF THE DISCLOSURE

The following presents a general summary of aspects of the disclosure in order to provide a basic understanding of at least some of its aspects. This summary is not an extensive overview of the disclosure. It is not intended to identify key or critical elements of the disclosure or to delineate the scope of the disclosure. The following summary merely presents some concepts of the disclosure in a general form as a prelude to the more detailed description provided below.

The present disclosure provides an in-vehicle device that collects driving data and provides feedback based on the driving data.

According to one aspect of the disclosure, a system comprises an in-vehicle device that includes a graphical user interface and a processor and data collection device wirelessly connected to the in-vehicle device. The in-vehicle device may be configured to receive vehicle telematics data from the data collection device. The processor may process the telematics data in real time and cause the telematics data to be displayed on the graphical user interface. Additionally, the graphical user interface may include a speed display and/or an acceleration display. Additionally, the acceleration display may include a two-dimensional rendering of a three-dimensional shape, wherein the two-dimensional rendering of the three-dimensional shape may be located within a larger geometric shape and wherein based on the processed telematics data, the two-dimensional rendering of the three-dimensional shape may move within the geometric shape. Further, the two-dimensional rendering of the three-dimensional shape and geometric shape may be defined by a bubble centered on a concentric circle, wherein the bubble may float in the center of the concentric circle when the vehicle is motion and may move within the concentric circle based on the processed telematics data.

According to another aspect of the disclosure, an in-vehicle device may comprise a processor configured to receive and process vehicle telematics data and a graphical user interface configured to display the telematics data. The in-vehicle device may be a cell phone, smartphone, or tablet, used solely as the processor and graphical user interface. For example, the in-vehicle feedback device may acquire the driving data directly from the device, such as a smart phone or tablet computer, via a built-in accelerometer and/or a Global Positioning System (GPS). The graphical user interface may include a bobble-head driving avatar that displays an animated event. Further, the bobble-head driving avatar may include a head that moves on a body based on the telematics data from the accelerometer. Additionally, the animated event may be triggered by a hard braking and the head goes forward on the bobble-head driving avatar to include an animated glass break after the hard braking occurs. In another aspect, the animated event may be triggered by a rapid acceleration and the head spins on the bobble-head driving avatar when the rapid acceleration occurs. In yet another aspect, the animated event is triggered by speeding and the head goes backward on the bobble-head driving avatar after the speeding occurs. Further, the animated event may be triggered by fast cornering and the bobble-head driving avatar falls over after the fast cornering occurs.

According to a further aspect of the disclosure, a computer-implemented method may comprise the steps of: receiving vehicle telematics data from a data collection device located in a vehicle; processing the telematics data in real-time by a processor, wherein the processing includes running a series of computer-readable instructions to generate a driving summary and analysis of the telematics data; and generating, by the processor, on a display located in the vehicle a bobble-head driving avatar, wherein the bobble-head driving avatar displays an animated event, and further wherein the bobble-head driving avatar includes a head that moves on a body based on the telematics data from the data collection device.

Other features and advantages of the disclosure will be apparent from the following specification taken in conjunction with the following drawings.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of various example embodiments of the disclosure, reference is made to the accompanying drawings, which form a part hereof, and in which are shown by way of illustration various example devices, systems, and environments in which aspects of the disclosure may be practiced. It is to be understood that other specific arrangements of parts, example devices, systems, and environments may be utilized and structural and functional modifications may be made without departing from the scope of the present disclosure. Also, while the terms "top," "bottom," "front," "back," "side," "left," "right," "up," "down," and the like may be used in this specification to describe various example features and elements of the disclosure, these terms are used herein as a matter of convenience, e.g., based on the example orientations shown in the figures. Nothing in this specification should be construed as requiring a specific three dimensional orientation of structures in order to fall within the scope of this disclosure.

General Description of Aspects of the Disclosure

The present disclosure provides an in-vehicle feedback device with a display or graphical interface that receives and/or collects driving data and provides feedback based on the driving data. In one exemplary embodiment, the in-vehicle feedback device, which may be configured to receive real-time vehicle data, may provide a driver with visual and/or audible in-vehicle feedback. The in-vehicle feedback device may process real-time (i.e., near real-time) data and then display the processed information in a meaningful way on a display or graphical user interface (GUI). Feedback from the interface may provide the driver with a consistent set of critical driving parameters that are intended to assist the driver in modifying their driving behavior while driving. In addition to providing the driver with behavior feedback, the in-vehicle feedback device may receive and/or collect critical driving data and store summary information for long-term driver feedback for the driver.

The in-vehicle feedback device may communicate with a data collection device or on-board diagnostics port of a car to collect the driving data in one exemplary embodiment. In another exemplary embodiment, the in-vehicle feedback device may acquire the driving data directly from the device, such as a smart phone or tablet computer, via a built-in accelerometer and/or a Global Positioning System (GPS).

Specific Examples of the Disclosure

While aspects of the disclosure generally have been described above, the following detailed description, in conjunction with the Figures, provides even more detailed examples of in-vehicle feedback devices, systems, and methods in accordance with examples of this disclosure. Those skilled in the art should understand, of course, that the following description constitutes descriptions of examples of the disclosure and should not be construed as limiting the disclosure in any way.

Figure 1:
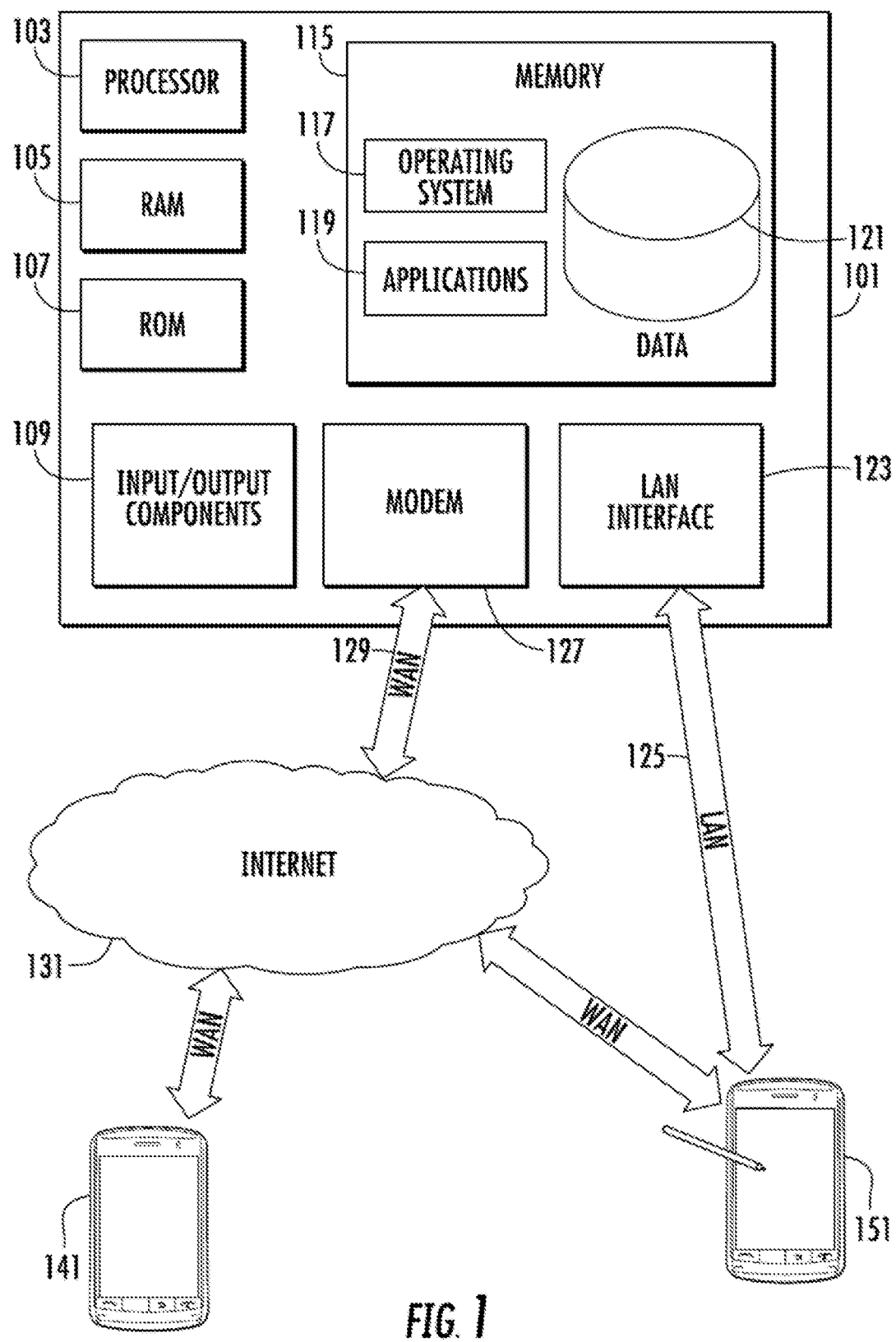
FIG. 1 is an illustrative operating environment in which various aspects of the disclosure may be implemented.

FIG. 1 generally discloses a block diagram of an in-vehicle feedback system 101 that in one exemplary embodiment of the disclosure collects critical driving data, processes the real-time data, and displays the processed information in a meaningful way on a graphical user interface. The in-vehicle feedback system 101 may have a processor 103 for controlling overall operation of the in-vehicle feedback system 101 and its associated components, which may include RAM 105, ROM 107, input/output component 109, and memory 115.

I/O 109 may include a data collection device, microphone, keypad, touch screen, and/or stylus through which a user of the in-vehicle feedback system 101 may provide input, and may also include one or more of a speaker for providing audio output and a video display device or graphical user interface for providing textual, audiovisual and/or graphical output. The I/O 109 may be connected via hardwire connections, such as USB, serial cables, parallel cables, etc. The I/O 109 may also be connected via wireless connections, such as Bluetooth, cellular technology, or other similar technologies. Software or applications may be stored within memory 115 and/or storage to provide instructions to processor 103 for enabling the in-vehicle feedback system 101 to perform various functions. For example, the memory 115 may store software used by the in-vehicle feedback system 101, such as an operating system 117, application programs 119, and an associated database 121. The processor 103 and its associated components may allow the in-vehicle feedback system 101 to run a series of computer-readable instructions to generate a driving summary for a particular individual and analyze the driving data, driving behaviors, and driving habits. Additionally, the application program 119 used by the in-vehicle feedback system 101 according to an illustrative embodiment of the disclosure may include computer executable instructions for invoking functionality related to receiving, verifying, determining, and analyzing the driving data and driving behavior of a driver.

The in-vehicle feedback system 101 may operate in a networked environment supporting connections to one or more other remote computers or devices, such as terminals 141 and 151. The terminals 141 and 151 may be devices, personal computers, or servers that include many or all of the elements described above relative to the in-vehicle feedback system 101. The network connections depicted in FIG. 1 include a local area network (LAN) 125 and a wide area network (WAN) 129, but may also include other networks. When used in a LAN networking environment, the in-vehicle feedback system 101 is connected to the LAN 125 through a network interface or adapter 123. When used in a WAN networking environment, the in-vehicle feedback system 101 may include a modem 127 or other means for establishing communications over the WAN 129, such as Bluetooth or the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

The disclosure is operational with numerous other general purpose or special purpose computing system environments or configurations. Examples of well-known computing systems, environments, and/or configurations that may be suitable for use with the disclosure include, but are not limited to, personal computers, personal data assistants, smartphones, tablet computers, cellular phones, internal vehicle micro-processors, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program applications or modules, being executed by a computer. Generally, program applications or modules include routines, programs, objects, components, data structures, etc. that perform particular tasks or implement particular abstract data types. The disclosure may also be practiced in distributed computing environments where tasks are performed by remote processing devices that are linked through a communications network. In a distributed computing environment, the program applications or modules may be located in both local and remote computer storage media including memory storage devices.

Figure 2:
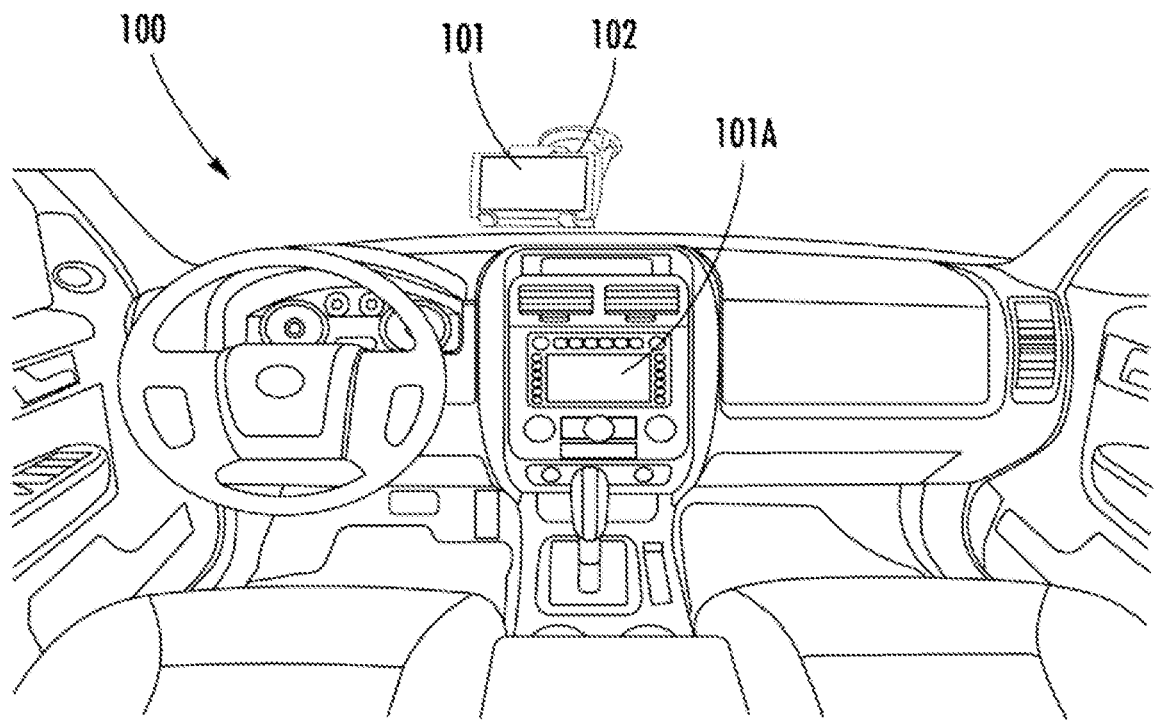
FIG. 2 is a perspective view of an inside of a vehicle in accordance with aspects of this disclosure.

As illustrated in FIG. 2, the in-vehicle feedback system 101 may be mounted to the inside of a vehicle 100, so that the driver of the vehicle 100 can see the in-vehicle feedback system 101 while driving. The in-vehicle feedback system 101 may be mounted anywhere in the vehicle 100, such as on the windshield, on the dashboard, on the driver's side window. The in-vehicle feedback system 101 may also be a component or display screen integrated into or on the vehicle dashboard, as illustrated at reference number 101A.

Figure 3:
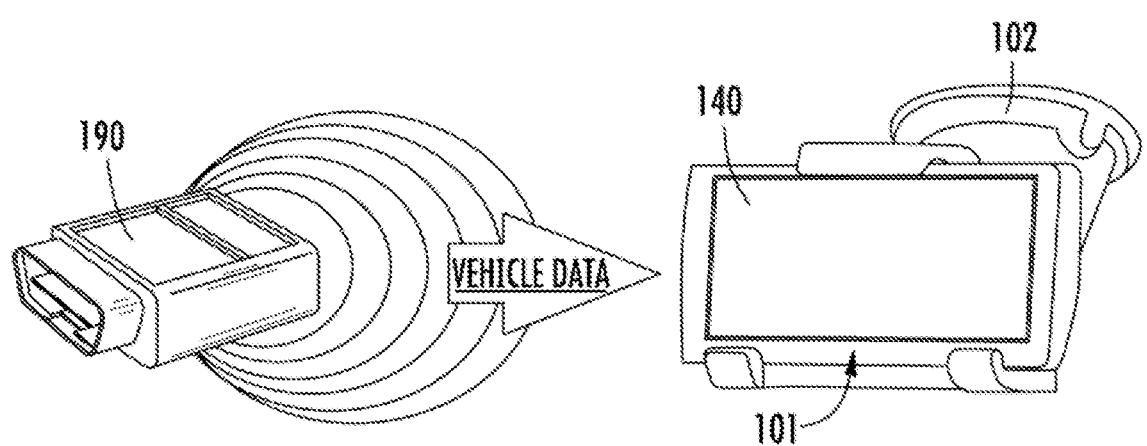
FIG. 3 is a perspective view of an in-vehicle feedback device and a data collection device in accordance with aspects of this disclosure.

The in-vehicle feedback system 101 may include a graphical user interface 140, a processor 103, and a data collection device 190. Additionally, without departing from the invention, the in-vehicle feedback system 101 may be a cellular phone, smartphone, or tablet computer, that acts as all of the graphical user interface 140, processor 103, and data collection device 190. In other words, in some embodiments of this invention, there does not need to be a separate data collection device 190 for the in-vehicle feedback system 101. As illustrated in FIG. 3, in an exemplary embodiment of the present disclosure, the graphical user interface 140 (which may also be referred to as display) allows the communication of vehicle data to the driver as sent from a processor 103 and/or a data collection device 190. The graphical user interface 140 may display a collection of the following vehicle data: 1) trip start 142; 2) vehicle speed display 144; 3) accelerometer data or vehicle acceleration display 146; and 4) trip summary 148.

The graphical user interface 140 may display the trip start time 142 as illustrated in FIG. 3. The trip start time 142 may be based on a data collection device 190 or processor 103 algorithm and/or timestamp format for the trip start. The location and/or format of the trip start time 142 may vary without departing from this disclosure.

The graphical user interface 140 may include the vehicle speed display 144. The vehicle speed display 144 may include a "real-time" vehicle speed 150 in miles per hour as illustrated in FIG. 3. The vehicle speed 150 may be represented as a digital readout as indicated in FIG. 3. Additionally, the vehicle speed 150 can be displayed as a circular speedometer, as would be displayed on a dashboard of a vehicle. The vehicle speed 150 may be collected at a 1 Hz rate and displayed at a 1 Hz update rate to ensure "real-time" speed. Additionally, the vehicle speed display 144 may include a maximum speed 152 and/or an average speed 154. These can be calculated either by the processor 103 or the data collection device 190. The maximum speed 152 and the average speed 154 may be tracked and displayed on a per-trip basis within the vehicle speed display 144. Additionally, the graphical user interface 140 may include a speed time-graph 156 for the vehicle speed, displaying a given speed over a pre-determined time. For the graphical user interface 140 illustrated in FIG. 3, the speed time-graph 156 displays the speed over the last 10 hours. Other times may be utilized without departing from this disclosure, such as over the last 2 hours, 4 hours, 6 hours, or 8 hours or more.

Figure 4:
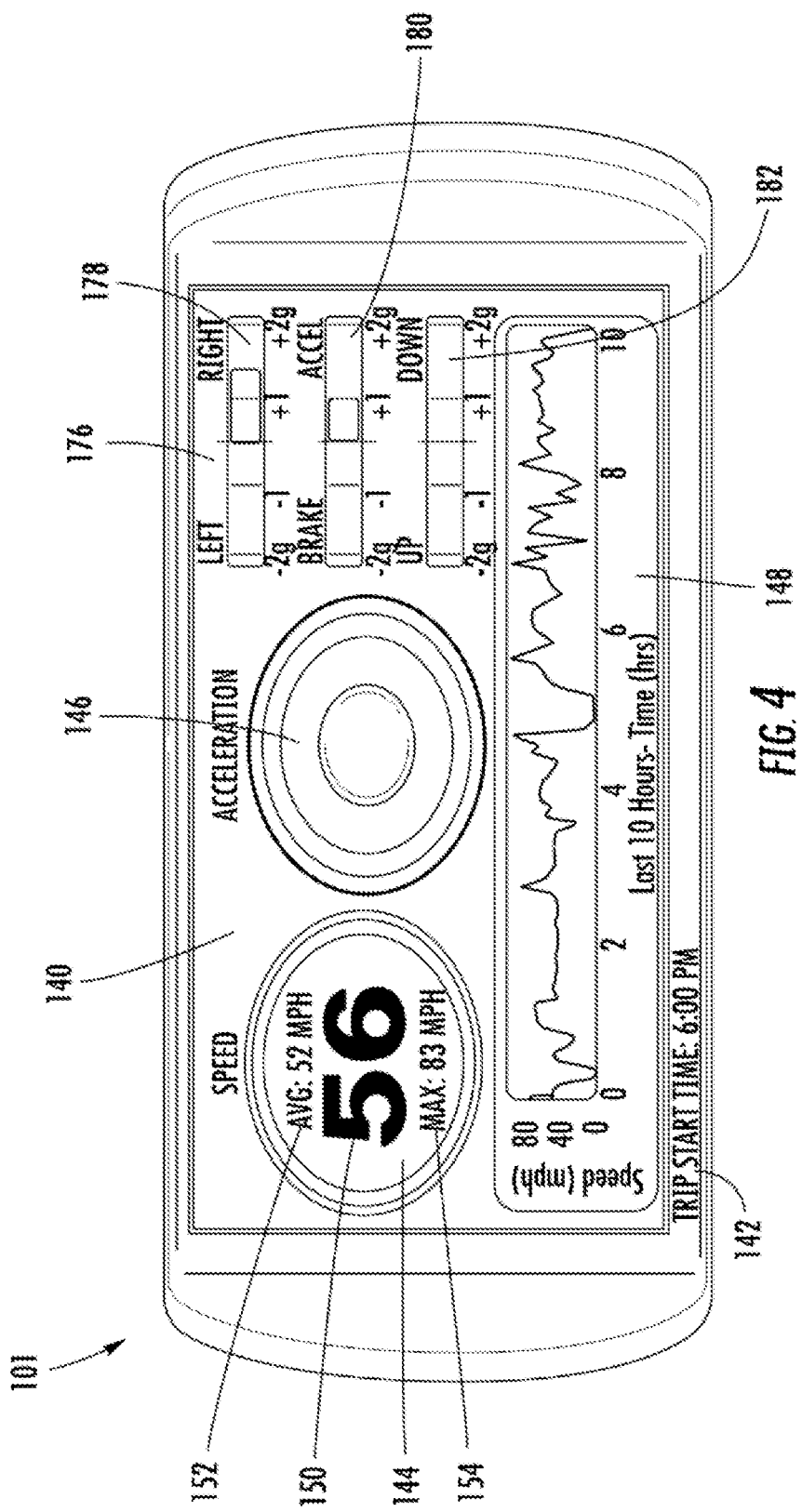
FIG. 4 is a perspective view of the in-vehicle feedback device shown in FIG. 3 in accordance with aspects of this disclosure.
Figure 5:
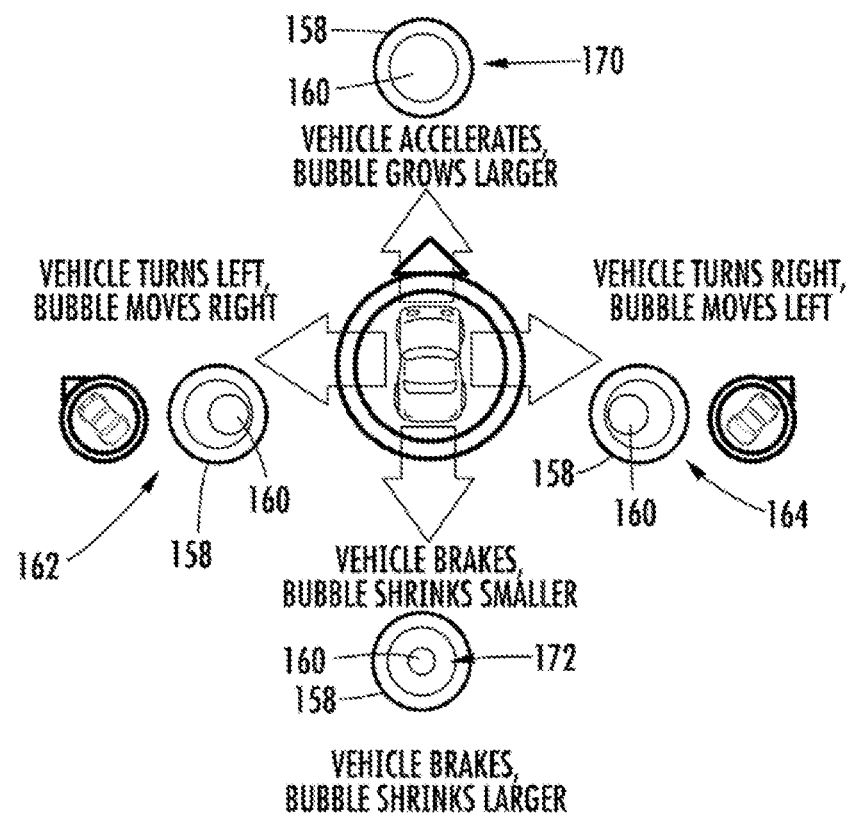
FIGS. 5 and 6 are detailed views of the acceleration data from the in-vehicle feedback device shown in FIG. 3 in accordance with aspects of this disclosure.
Figure 6:
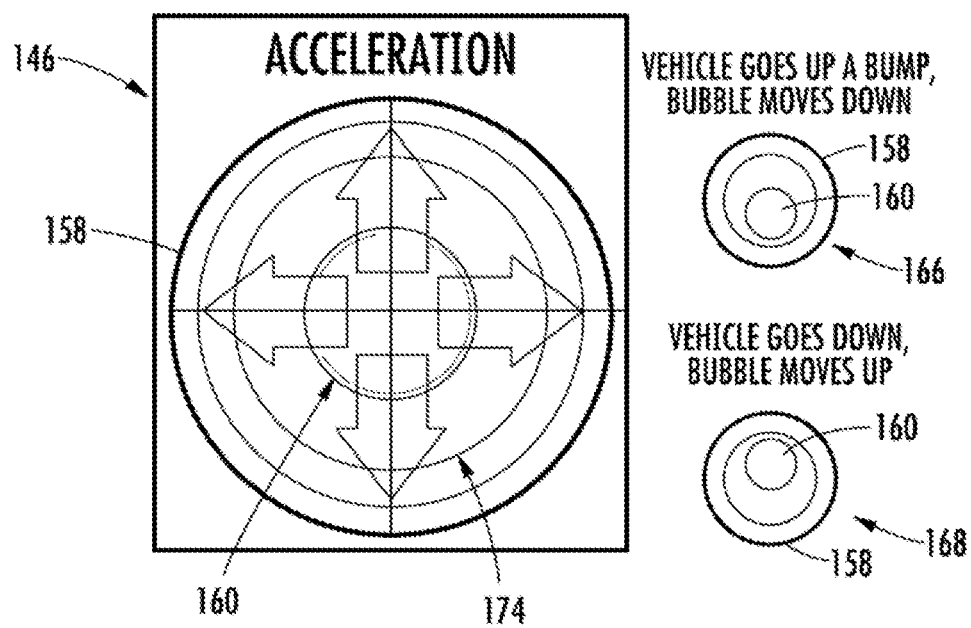
Figure 7:
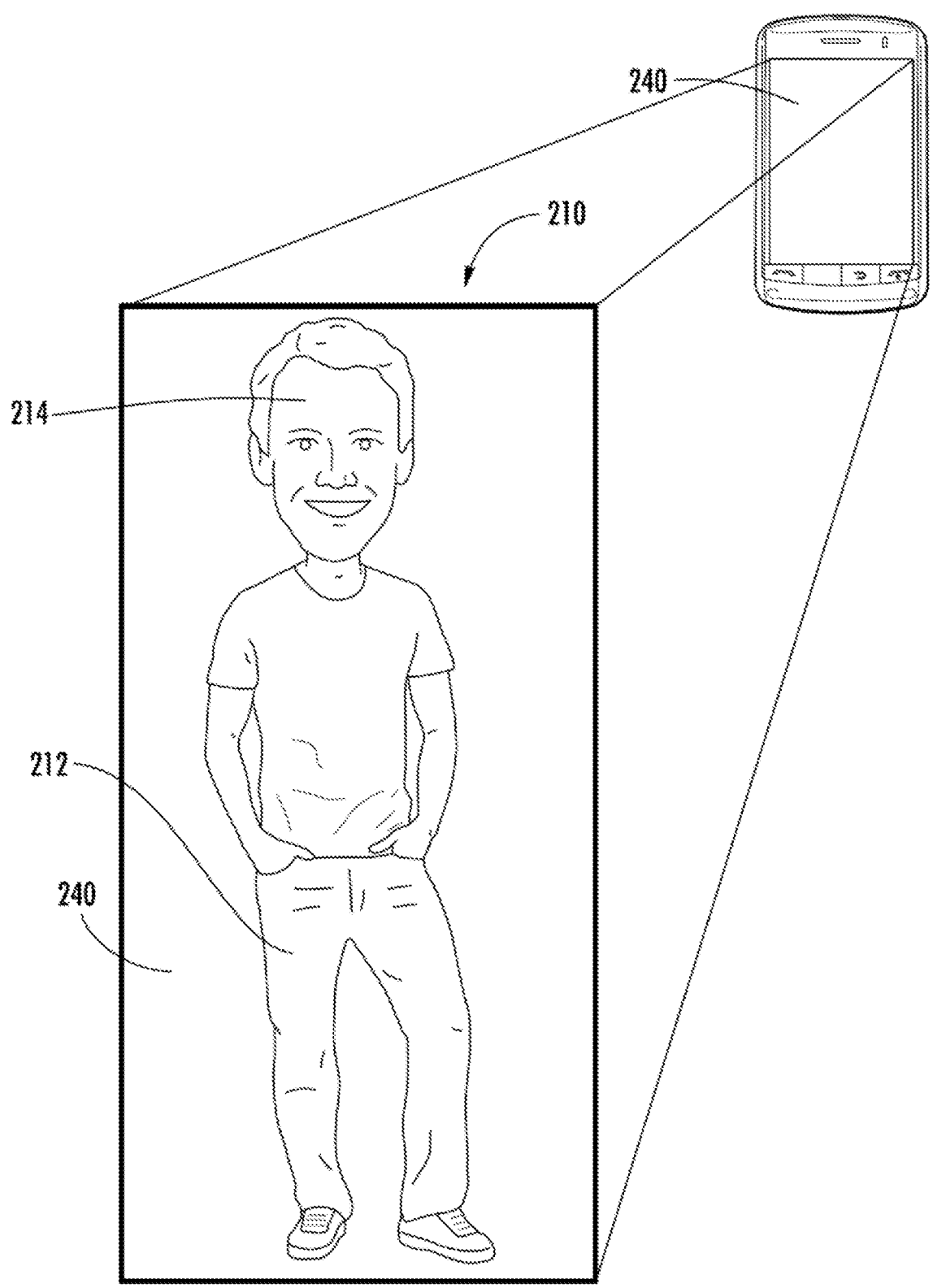
FIG. 7 is a perspective view of an in-vehicle feedback device with an exploded view of the graphical user interface on the in-vehicle feedback device in accordance with aspects of this disclosure.

Additionally, as illustrated in FIGS. 3 through 5, the graphical user interface 140 may display the vehicle acceleration 146. Acceleration may be defined as the increase in the rate or speed of the vehicle. Acceleration data may be collected at 24 Hz and displayed at the maximum refresh rate of the serial interface and the screen/display refresh rate. The data collection device 190 may provide and communicate accelerometer feedback or acceleration data 146 to the processor 103. The acceleration data 146 may be displayed in number of "g", meaning the gravitational constant ($g=9.81$ m/s$^2$=32.2 ft/s$^2$). The maximum and minimum acceleration may be displayed as +/−2 g in the x, y, and z axes, generally with the x-axis representing the side-to-side movement of the vehicle, the y-axis representing the forward-backward movement of the vehicle, and the z-axis representing the upward-downward movement of the vehicle. Other representations for the acceleration axes may be utilized without departing from this disclosure. For the present embodiment, the accelerometer data 146 may be displayed in one or both of two different displays on the graphical user interface 140.

In one exemplary embodiment, as illustrated in FIGS. 4 and 5, the acceleration data 146 may be displayed as a "bobble-ball" display 160. The bobble-ball display 160 may indicate the acceleration data 146 in the form of a bubble 160, centered on a concentric circular display 158. Additionally, the bobble-ball display 160 may include a two-dimensional rendering of a three-dimensional shape that is located within a larger geometric shape, such as a rectangle, square, triangle, oval, etc. The bubble 160 may float within the center of the circle 158 when the vehicle is in motion. Based on output from the accelerometer or data collection device 190 in the x, y, and z axes, the bubble 160 may move within the concentric circle 158. The bubble 160 moving within the concentric circle 158 may be defined as moving either wholly or partially within the boundaries of the concentric circle 158 or larger geometric shape. The bubble 160 may move right 162 based on the vehicle turning left. Further, the bubble 160 may move left 164 the vehicle turning right. Additionally, the bubble 160 may move down 166 when the vehicle goes up or over a bump. And the bubble 160 may move up 168 when the vehicle goes down. When the vehicle accelerates, the bubble 160 will grow larger 170 and oppositely, when the vehicle decelerates or brakes, the bubble 160 will shrink smaller 172.

Additionally, there may be a threshold circle or indication line 174 in the concentric circular display 158. For example, the threshold circle 174 may be located at approximately 0.5 g. If the threshold limit is exceeded in any direction, the bubble 160 may change colors and/or blink. For example, the bubble 160 may be blue or green to start and then if the threshold limit is exceeded, the bubble 160 may turn to red. Additionally, if the driver exceeds the thresholds a certain amount of times, for example, three times, the ball may change colors for the rest of the trip to indicate a bad driving trip.

In another exemplary embodiment, the acceleration data 146 may be displayed with graphical user interface 140 as an acceleration bar-graph display 176. The acceleration bar-graph 176 may display the accelerometer values in each direction as illustrated in FIG. 4. First, the acceleration bar-graph 176 may include a left-right acceleration line graph 178, with the −2 g numbers representing a left acceleration (or right turn), and the +2 g numbers representing a right acceleration (or left turn). Additionally, the acceleration bar-graph 176 may also include a brake-acceleration line graph 180, with the −2 g numbers representing braking and the +2 g numbers representing forward acceleration. Lastly, the acceleration bar-graph 176 may also include an up-down line graph 182, with the −2 g numbers representing upward acceleration and the +2 g numbers representing downward acceleration. The "+/−2 g" numbers as described above may be changed or different without departing from this disclosure. For example, the lower limit may be −1 g with the upper limit at +1 g, or the lower limit may be −3 g with the upper limit at +3 g.

Additionally, as illustrated in FIG. 4, the graphical user interface 140 may display a trip summary 148. The trip summary 148 may include trip data and information for a set amount of time. In an exemplary embodiment, the trip summary 148 may include up to 10 hours of trip data. In other exemplary embodiments, the trip summary 148 may include up to 2 hours of trip data, 4 hours of trip data, 6 hours of trip data, 8 hours of trip data, or 12 or more hours of trip data. The trip data may include any of the trip measurements as was described and included above, such as speed or acceleration. The trip summary 148 may display the historical data in an area dedicated on the graphical user interface 140. In the exemplary embodiment illustrated in FIG. 4, the trip summary 148 is displayed on the bottom half of the graphical user interface 140. The trip summary 148 may be displayed in any area of graphical user interface 140 without departing from this disclosure.

In one embodiment, the trip data may be displayed on the side or y-axis of the trip summary 28 with the time listed along the bottom or x-axis of the trip summary 28. For example, in FIG. 2, speed is illustrated on the y-axis and is set for 0-80 miles per hour. Trip data that exceeds a preset limit (such as 80 miles per hour) may increment the scale by a set increment (such as 10 miles per hour increments) to show the driver exceeded 80 miles per hour. Additionally, the speed collected above 80 miles per hour may be displayed in a different color. In an exemplary embodiment, when a driver exceeds 80 miles per hour, then the scale increments 10 miles per hour to 90 miles per hour and any time that the driver exceeded 80 miles per hour will be shown in red on the trip summary 28. Other colors and other scales may be utilized without departing from this disclosure.

The in-vehicle feedback system 101 may also include a data collection device 190. The data collection device 190 may also be referred to as a datalogger. The data collection device 190 may record data over time and/or in relation to location. The data collection device 190 may record data using built-in instruments or sensors, such as a built-in accelerometer or global positioning system. The data collection device 190 may also record data using external instruments and sensors, such as the vehicle speedometer. The data collection device 190 may be wire-connected or wirelessly connected to the processor 103 to send the vehicle driving data to the processor 103. The data collection device 190 may be battery powered, portable, and equipped with a microprocessor, internal memory for data storage, and sensors. The data collection device 190 may interface with the processor 103 or a personal computer/tablet/smartphone and utilize software to activate the data collection device 190 to view and analyze the collected data.

In one embodiment, the data collection device 190 may include a modified version of the DataLogger DL200® product manufactured by Danlaw. In other embodiments, data collection devices manufactured by other companies may also be used. This data collection device 190 may include an integrated Bluetooth serial interface with an internal Bluetooth antenna. Additionally, the Bluetooth serial interface may communicate vehicle data between the vehicle and a Bluetooth equipped in-vehicle feedback system 101. The Bluetooth serial interface may be integrated into the data collection device 190 without the need for any installation needs beyond the installation of the data collection device 190 into the on-board diagnostic port on the vehicle. Additionally, in another exemplary embodiment, the in-vehicle feedback device may acquire the driving data directly from the device, such as a smart phone or tablet computer, via a built-in accelerometer and/or a Global Positioning System (GPS).

FIGS. 7 through 12 illustrate another embodiment of the present disclosure. In this embodiment, a graphical user interface 240 may include a bobble-head display 210. The bobble-head display 210 generally includes a body 212 and a head 214. The head 214 may be oversized compared to the body 212. The head 214 may be connected to the body 212 in a loose way (for example by a spring or hook), in such a way that any movement will cause the head 214 to bobble in the direction of the movement of the vehicle.

In one embodiment, as illustrated in FIGS. 7 through 12, the graphical user interface 240 may include a driving mode or bobble-head view 220. In the bobble-head view 220, a selected bobble-head avatar 210 may be displayed in an animated state. The bobble-head avatar 210 may include both a body 212 and a head 214. The head 214 of the bobble-head avatar 210 may move and bobble based the vehicle telematics data from the accelerometer and/or the global positioning system.

The bobble-head avatar 210 may display certain animated events as a driver is driving the vehicle based on the specific vehicle telematics and triggered events. These vehicle telematics and triggered events may include hard breaking, rapid acceleration, speeding, and fast cornering. When any of the triggered events occur, the bobble-head avatar may move in accordance with each animated event as will be described below.

Figure 8:
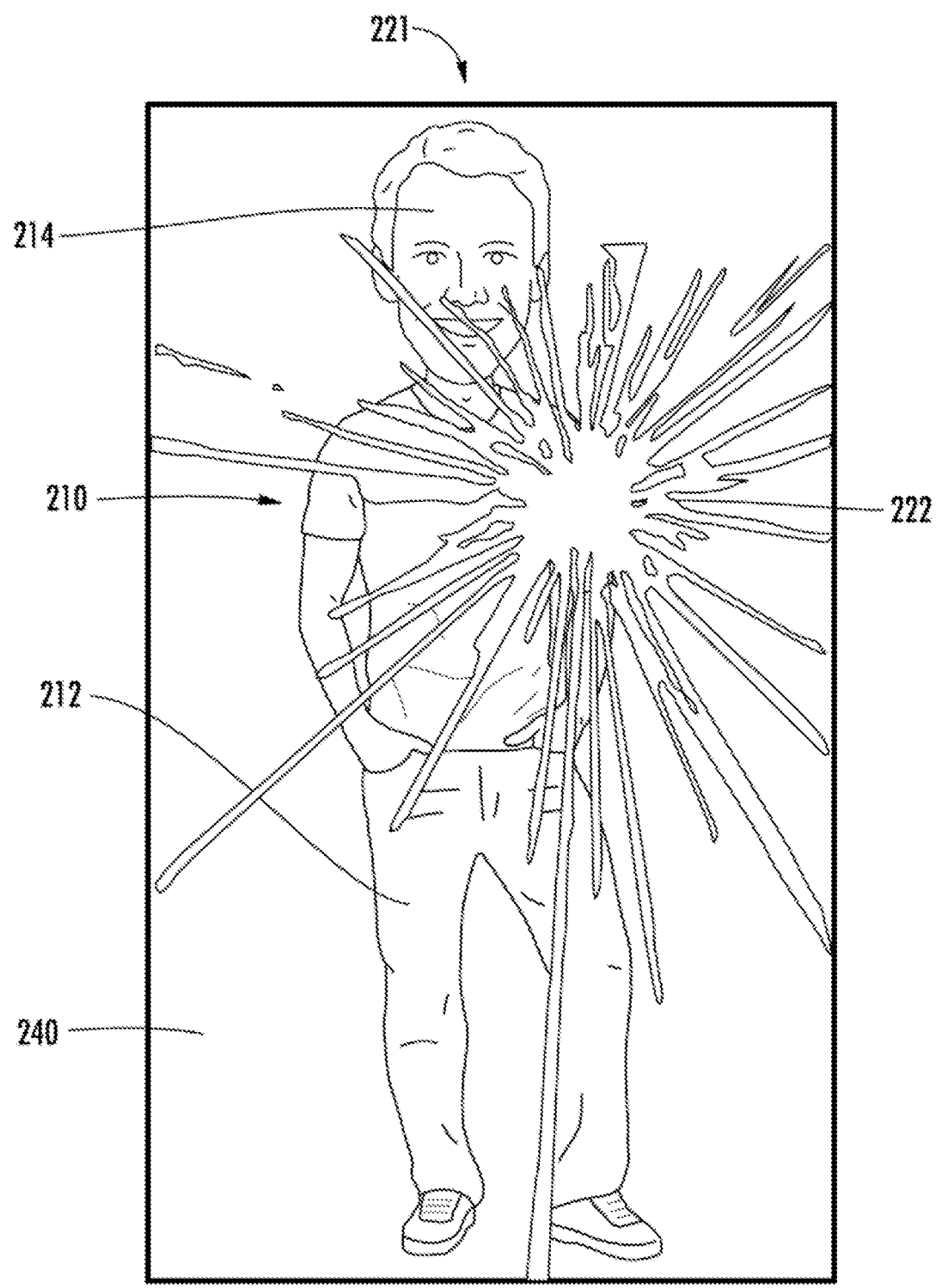
FIGS. 8-13 are exploded views of the graphical user interface on the in-vehicle feedback device shown in FIG. 7 in accordance with aspects of this disclosure.

FIG. 8 illustrates the bobble-head avatar 210 after the triggered event of hard braking or rearward acceleration occurs thus causing the hard braking animated event 221. The triggered event of hard braking may be user-defined or may be defined within the system. For example, hard braking may be defined as exceeding a certain rearward acceleration level as measured by the accelerometer. This rearward acceleration level may be preset within the processor 103, wherein the user has no ability to change or adjust this rearward acceleration preset level, such as −1 g. In another aspect of this disclosure, this rearward acceleration level may be preset within the processor 103 (such as −1 g), however, a user may have the ability to change or adjust this preset rearward acceleration, or hard braking, level (changing the set level to −1.5 g from −1 g). When the vehicle's rearward acceleration exceeds the rearward acceleration set level, the triggered event of hard braking occurs.

In another aspect of this disclosure, a second rearward acceleration level may be preset, user-defined, or defined within the processor 103 representing an extreme hard braking event. The second rearward acceleration level may be higher than the rearward acceleration level. For example, the rearward acceleration set level may be −1 g and the second rearward acceleration level may be −2 g. This second rearward acceleration level may be recorded and tabulated for further reporting for driving statistics.

The rearward acceleration triggered event may then cause a hard braking animated event 221 from the bobble-head avatar 210 and the graphical user interface 240. For example, the hard braking animated event 221 may include the bobble-head avatar head 214 moving forward. Additionally, as illustrated in FIG. 8, the hard braking animated event 221 may include an animated glass break 222, wherein the graphical user interface 240 looks as if it is cracked where the head 214 may hit the glass. Additionally, the hard braking animated event 221 may include adding a nose splint to the bobble-head avatar 210. Additionally, the hard braking animated event 221 may include an audible alert or saying, such as saying, "Ahhh! My nose!" Other similar alerts or actions may occur without departing from this disclosure.

Figure 9:
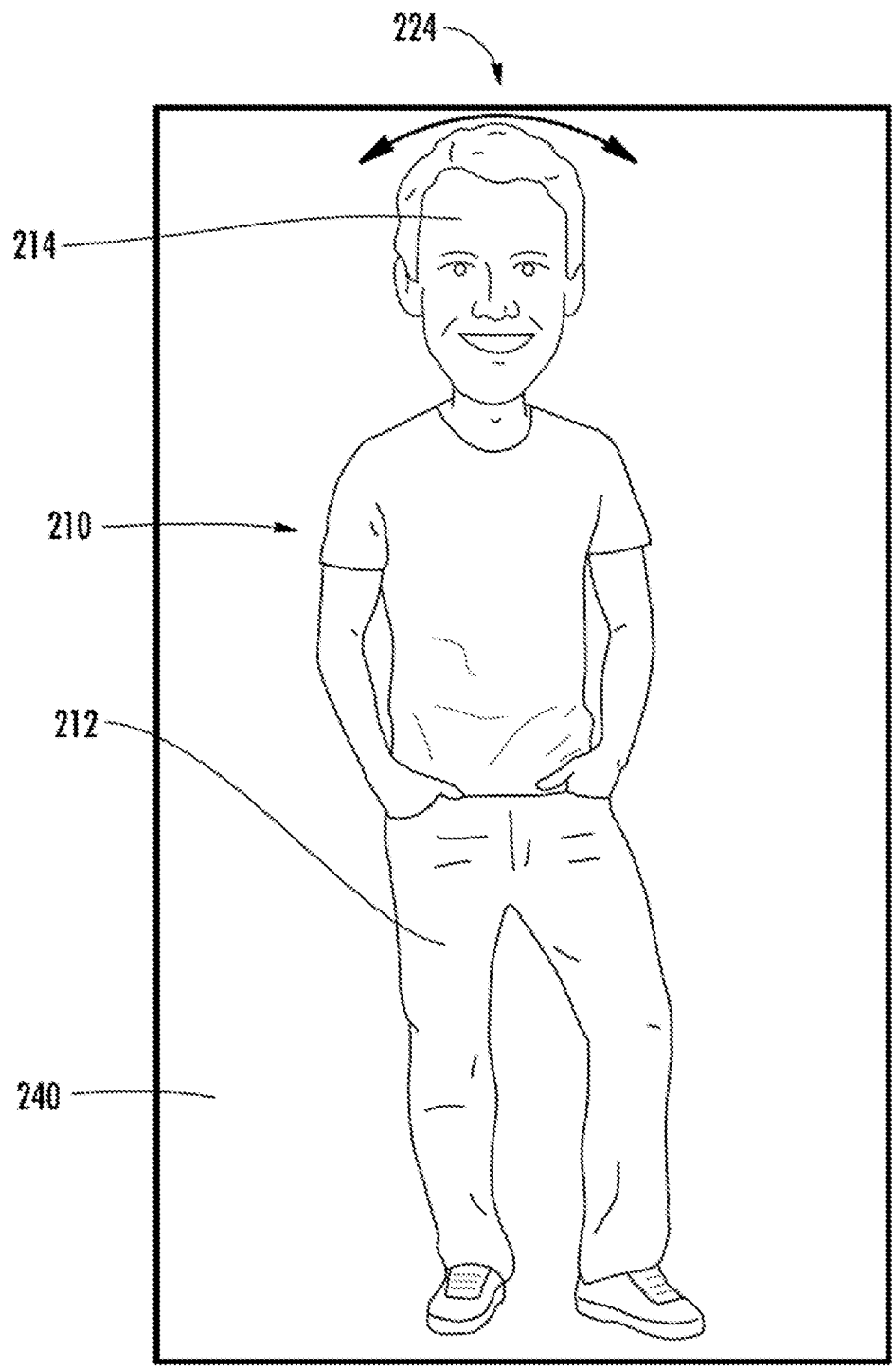

FIG. 9 illustrates the bobble-head avatar 210 after the triggered event of rapid acceleration or forward acceleration occurs thus causing the rapid acceleration animated event 224. The triggered event of rapid acceleration may be user-defined or may be defined within the processor 103. For example, rapid acceleration may be defined as exceeding a certain forward acceleration level as measured by the accelerometer. This forward acceleration level may be preset within the processor 103, wherein the user has no ability to change or adjust this preset forward acceleration level, such as +1 g. In another aspect of this disclosure, this forward acceleration level may be preset within the processor 103 (such as +1 g), however, a user may have the ability to change or adjust this preset forward acceleration, or rapid acceleration, level (changing the set level to +1.5 g from +1 g). When the vehicle's forward acceleration exceeds the forward acceleration set level, the triggered event of rapid acceleration occurs.

In another aspect of this disclosure, a second forward acceleration level may be preset, user-defined, or defined within the processor 103 representing an extreme rapid acceleration event. The second forward acceleration level may be higher than the forward acceleration level. For example, the forward acceleration set level may be +1 g and the second forward acceleration level may be +2 g. This second forward acceleration level may be recorded and tabulated for further reporting for driving statistics.

The forward acceleration triggered event may then cause a rapid acceleration animated event 224 from the bobble-head avatar 210 and the graphical user interface 240. For example, the rapid acceleration animated event 224 may include the bobble-head avatar head 214 spinning around on the body 212. Additionally, the rapid acceleration animated event 224 may include an audible alert or saying, such as saying, "I'm already a bobble head." Other similar alerts or actions may occur without departing from this disclosure.

Figure 10:
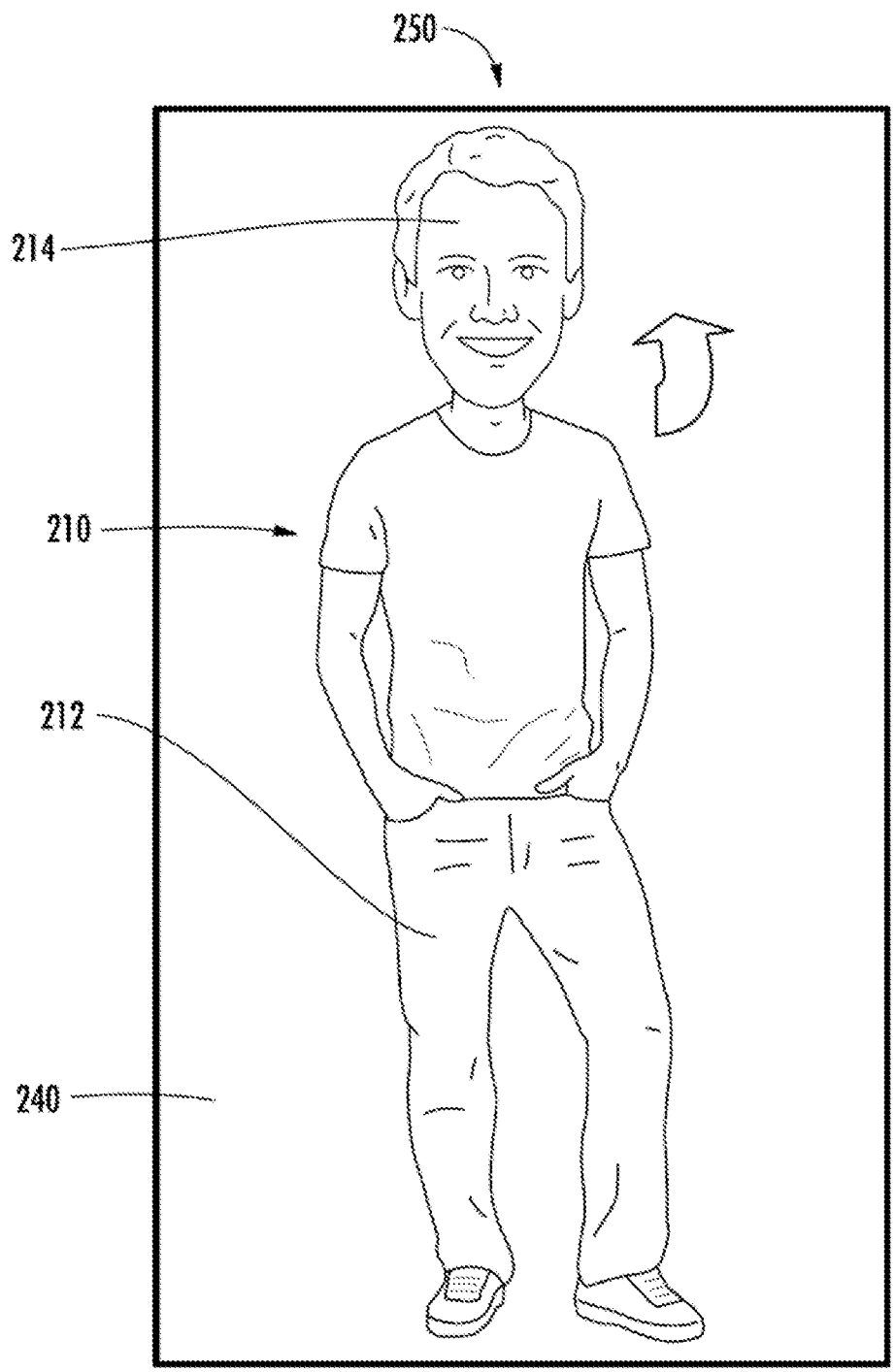

FIG. 10 illustrates the bobble-head avatar 210 after the triggered event of speeding occurs thus causing the speeding animated event 226. The triggered event of speeding may be user-defined or may be defined within the processor 103. For example, speeding may be defined as exceeding a certain speed as measured by the accelerometer and the global positioning system and/or computed by the processor 103. This speeding level may be preset within the processor 103, wherein the user has no ability to change or adjust this preset speeding level, such as greater than 55 miles per hour. In another aspect of this disclosure, this speeding level may be preset within the processor 103 (55 miles per hour), however, a user may have the ability to change or adjust this preset speeding level (changing the set level to 65 miles per hour from 55 miles per hour). When the vehicle's speed exceeds the speeding set level, the triggered event of speeding occurs.

In another aspect of this disclosure, a second speeding level may be preset, user-defined, or defined within the processor 103 representing an extreme speeding event. The second speeding level may be higher than the speeding level. For example, the speeding set level may be 55 miles per hour and the second speeding level may be 75 miles per hour. This second speeding level may be recorded and tabulated for further reporting for driving statistics.

In another aspect of this disclosure, the triggered event of speeding may be linked to the actual speed limit of the location of the vehicle. The in-vehicle feedback device 101 may track where the vehicle currently is located using the global positioning system. The processor 103 may then determine the speed limit posted for that current location and then determine if the vehicle is exceeding the posted speed limit of the vehicle's current location. As with above, this speeding level may be preset within the processor 103, wherein the user has no ability to change or adjust this preset speeding level, such as greater than 5 miles per hour over the posted speed limit. In another aspect of this disclosure, this speeding level may be preset within the processor 103 (5 miles per hour over the posted speed limit), however, a user may have the ability to change or adjust this preset speeding level (changing the set level to 10 miles per hour over the posted speed limit from 5 miles per hour). When the vehicle's speed exceeds the speeding set level, the triggered event of speeding occurs.

The speeding triggered event may then cause a speeding animated event 226 from the bobble-head avatar 210 and the graphical user interface 240. For example, the speeding animated event 226 may include the bobble-head avatar head 214 moving or snapping back from the body 212. Additionally, the speeding animated event 226 may include an audible alert or saying, such as saying, "Whoa! In a hurry?" Other similar alerts or actions may occur without departing from this disclosure.

Figure 11:
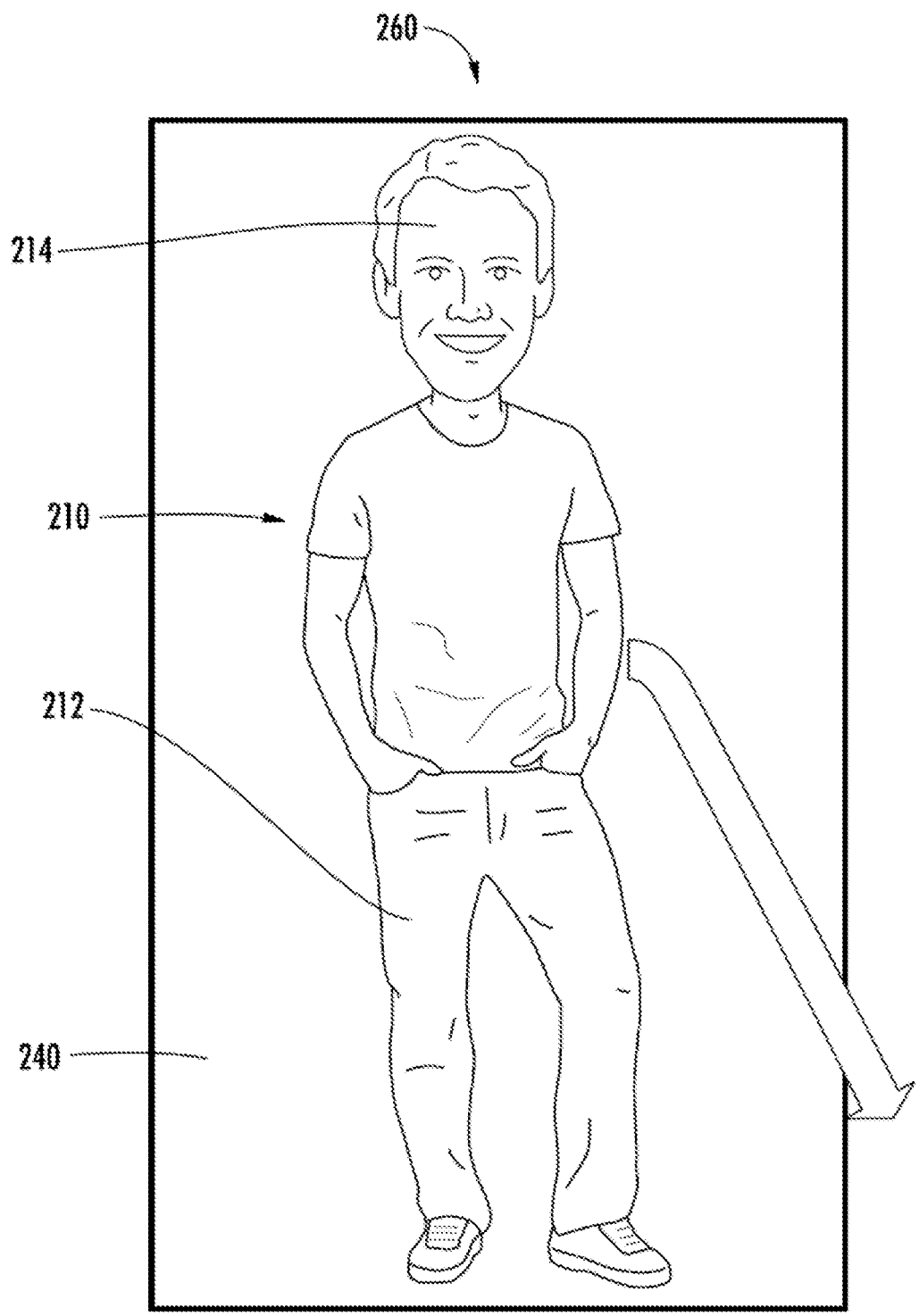

FIG. 11 illustrates the bobble-head avatar 210 after the triggered event of fast corning or side acceleration occurs thus causing the fast corning animated event 228. The triggered event of fast cornering may be user-defined or may be defined within the processor 103. For example, fast cornering may be defined as exceeding a certain side acceleration level as measured by the accelerometer. This side acceleration level may be preset within the processor 103, wherein the user has no ability to change or adjust this preset side acceleration level, such as +/−1 g sideways. In another aspect of this disclosure, this side acceleration level may be preset within the processor 103 (such as +/−1 g sideways), however, a user may have the ability to change or adjust this preset side acceleration, or fast cornering, level (changing the set level to +/−1.5 g sideways from +/−1 g sideways). When the vehicle's side acceleration exceeds the side acceleration set level, the triggered event of fast cornering occurs.

In another aspect of this disclosure, a second side acceleration level may be preset, user-defined, or defined within the processor 103 representing an extreme fast cornering event. The second side acceleration level may be higher than the side acceleration level. For example, the side acceleration set level may be +/−1 g and the second side acceleration level may be +/31 2 g. This second side acceleration level may be recorded and tabulated for further reporting for driving statistics.

The side acceleration triggered event may then cause a fast cornering animated event 228 from the bobble-head avatar 210 and the graphical user interface 240. For example, the fast cornering animated event 228 may include the bobble-head avatar 210 falling over or tipping over on the side of the body 212. Additionally, the fast cornering animated event 228 may include an audible alert or saying, such as saying, "I've fallen and can't get up!" Other similar alerts or actions may occur without departing from this disclosure.

In another aspect of this disclosure, other animated events may occur. For example, a night driving animated event may be triggered based on the time of day. For example, the night driving animated event may include the bobble-head avatar 210 either growing a beard or having the beard get darker on the head 214 of the bobble-head avatar 210. Additionally, the night driving animated event may include an audible alert or saying, such as saying, "Hoooowl." Other similar alerts or actions may occur without departing from this disclosure.

In another aspect of this disclosure, a total mileage animated event may be triggered based on the total mileage traveled during a trip. The triggered event of total mileage may be user-defined or may be defined within the processor 103. This total mileage level may be preset within the processor 103, wherein the user has no ability to change or adjust this preset total mileage level, such as greater than 100 miles. In another aspect of this disclosure, this total mileage level may be preset within the processor 103 (such as 100 miles), however, a user may have the ability to change or adjust this preset total mileage level (changing the set level to 200 miles from 100 miles). When the vehicle has traveled more than the total mileage set level, the triggered event of total mileage occurs.

For example, the total mileage animated event may include the bobble-head avatar 210 crossing its legs and with the bobble-head avatar 210 looking like it has to use a restroom or bathroom. Additionally, the total mileage animated event may include an audible alert or saying, such as saying, "Are we there yet?" Other similar alerts or actions may occur without departing from this disclosure.

Figure 12:
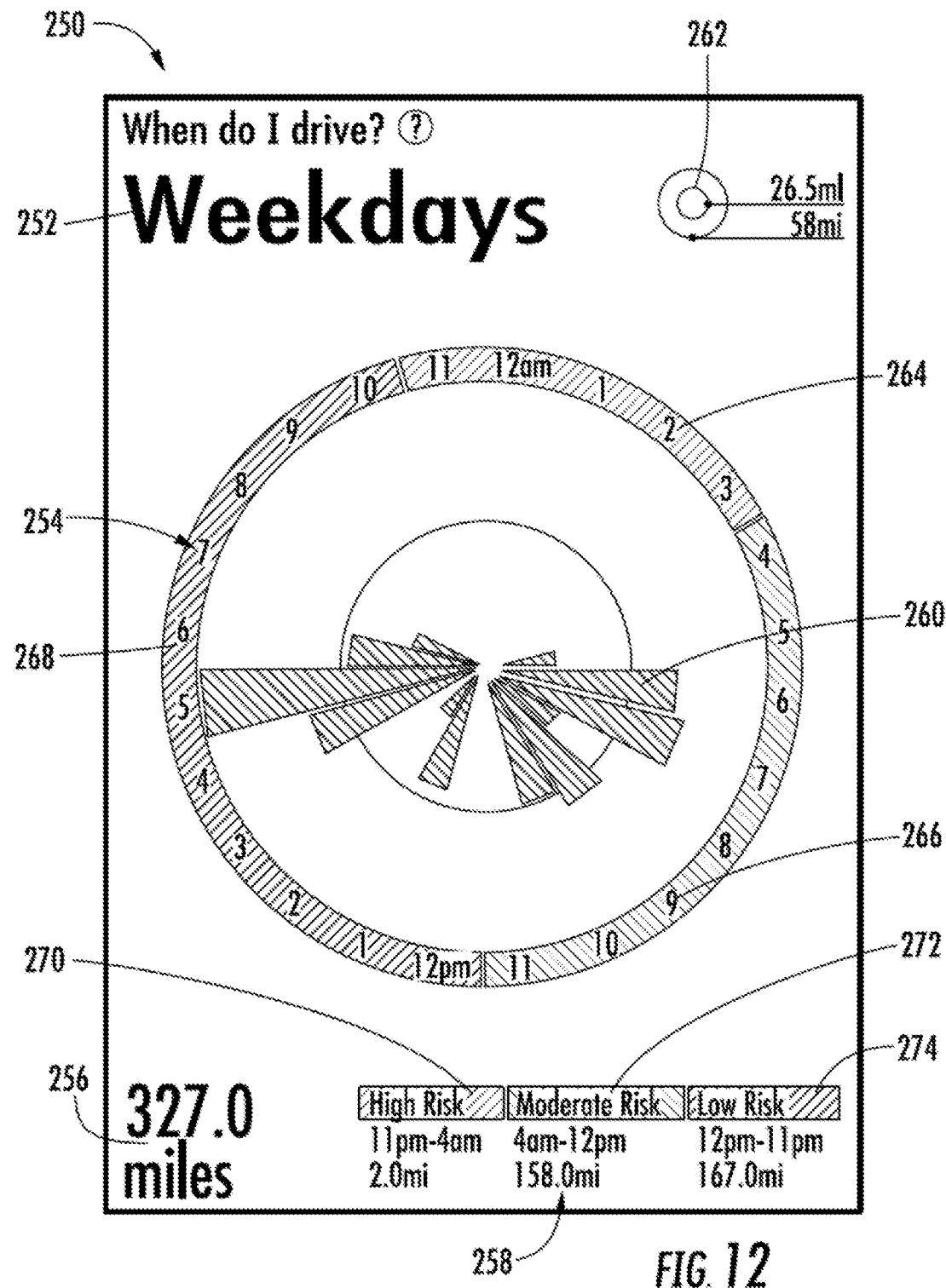
Figure 13:
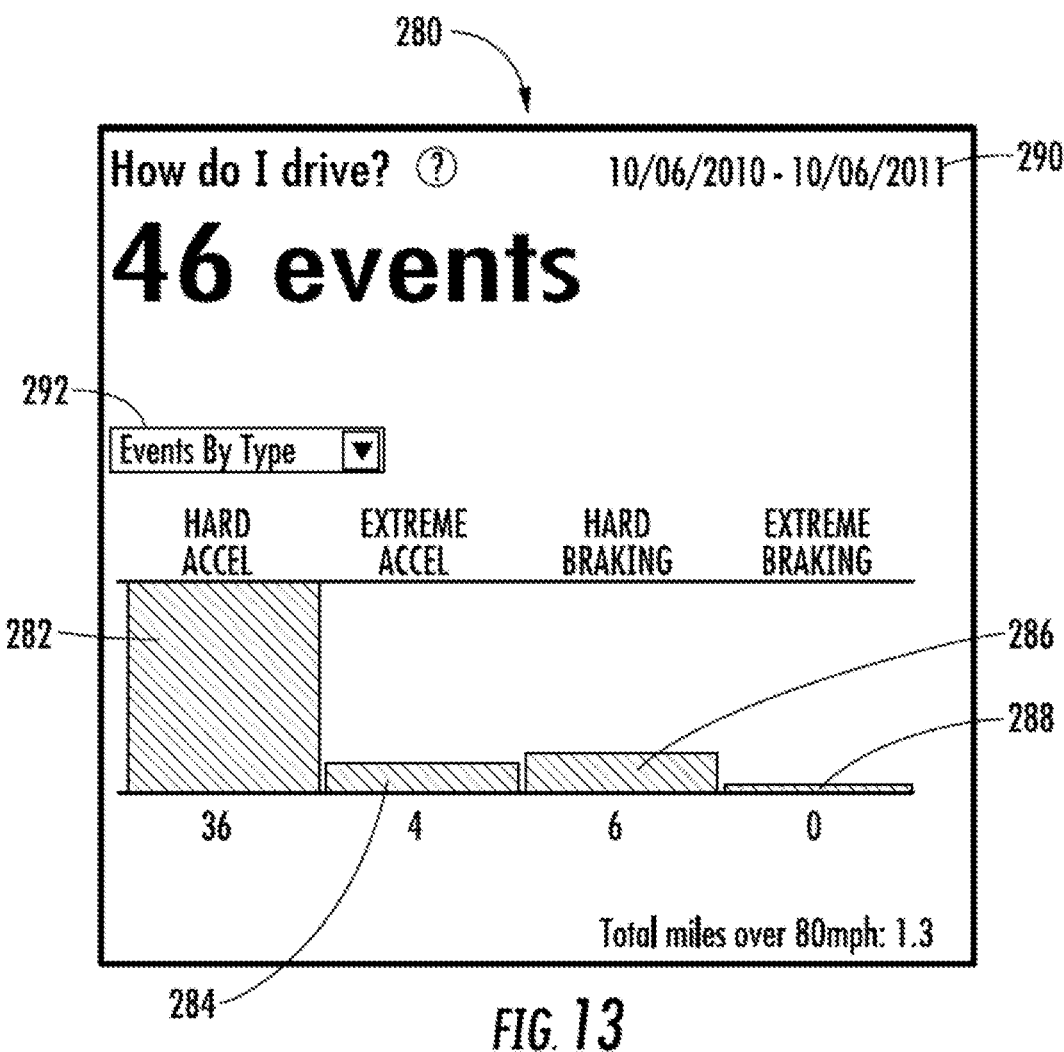

In another aspect of the disclosure, the processor 103 may maintain and provide driving statistics to the graphical user interface 240. For example, the driving statistics may be provided on the graphical user interface based on when the driver is driving as illustrated in FIG. 12 in a time chart 250. In another embodiment of this disclosure, the driving statistics may be illustrated on the graphical user interface based on how the driver is driving as illustrated in FIG. 13 in a driving behavior chart 280.

As illustrated in FIG. 12, the graphical user interface 240 may include the time chart 250. The time chart 250 may present and illustrate the cumulative times and miles when a driver is operating the vehicle. The time chart 250 may include a time-frame 252, a circular driving chart 254, a total miles section 256, and a risk summary chart 258. For the time-frame 252, a user may select any of a various set of different time-frames to display the data for the circular driving chart 254. For example, the driver can select weekdays, weekends, past month, past three months, past week, past 2/3/4 weeks, past six months, and past year. Other time-frames 252 may be made available without departing from this disclosure. The total miles section 256 may represent the total miles traveled during the selected time-frame 252.

As illustrated in FIG. 12, the time chart 250 may be in the shape of a circle. Other shapes may be utilized without departing from this disclosure. The time chart 250 may include a 24-hour chart around the outside going from 12 am at the top to 12 pm at the bottom and around back to 12 am at the top. In the middle of the time chart 250, various outwardly projecting bars 260 represent different drive events that are charted towards the respective driving time. Additionally, the length of the outward projection of the bars 260 may represent the length of the drive in miles. Without departing from this disclosure, the length of the outward projection of the bars 260 may represent the length of the drive in time. Additionally, a key 262 may be utilized to assist with the representation of the length (or time) of the drive. In the exemplary embodiment illustrated in FIG. 12, the key 262 illustrates that the small circle represents 26.5 miles, while the outside of the circle represents 53 miles.

Additionally, as illustrated in FIG. 12, the time chart 250 may be divided into various different sections and colors based on the risk level. For example, the times from 11 pm to 4 am may be colored red representing a "High Risk" time 264 for driving. Additionally, the times from 4 am to 12 pm may be colored yellow or orange representing a "Moderate Risk" time 266 for driving. Additionally, the times from 12 pm to 11 pm may be colored blue or green representing a "Low Risk" time 268 for driving. Other colors, times, and divisions for the time chart may be utilized without departing from this disclosure.

As further illustrated in FIG. 12, the driving time chart 250 includes a risk summary chart 258. The risk summary chart 258 may include "High Risk" 270, "Moderate Risk" 272, and "Low Risk" 274. Under each of these risks, may be listed a time-frame that these risks are active. For example, "High Risk" 270 may be listed during the time from 11 pm to 4 am. Additionally, "Moderate Risk" 272 may be listed during the time from 4 am to 12 pm. Lastly, "Low Risk" 274 may be listed during the time from 12 pm to 11 pm. The risk summary chart 258 may also include the total miles that the driver has operated the vehicle at each of those risks.

Additionally, as illustrated in FIG. 13, the driving statistics may be represented by a driving behavior chart 280. The driving behavior chart 280 may illustrate in bar-graph format the number of occurrences for a given driving event over a time-frame. In the exemplary embodiment, as illustrated in FIG. 13, the hard acceleration event 282 occurred 36 times, the extreme acceleration event 284 occurred 4 times, the hard braking event 286 occurred 6 times, and the extreme braking event 288 occurred 0 times over the time-frame 290 from Oct. 6, 2010-Oct. 6, 2011.

Additionally, the driving behavior chart 280 may be time-selectable. For example, for a time-frame 290, a user may select any of a various set of different time-frames 290 to display the data for the driving behavior chart 280. For example, the driver can select weekdays, weekends, past month, past three months, past week, past 2/3/4 weeks, past six months, and past year. Other time-frames 290 may be made available without departing from this disclosure.

Additionally, the driver may select the categories 290 to be presented on the driving behavior chart 280. As illustrated in the exemplary embodiment, hard acceleration, extreme acceleration, hard braking, and extreme braking are included with the driving behavior chart 280. The driver may also include fast cornering, extreme fast cornering, speeding, and extreme speeding. Other categories of driver behavior and statistics may be included with the driving behavior chart 280 without departing from this disclosure.

In another aspect of the disclosure, a bobble-head avatar library may be provided. A driver may unlock and load new bobble-head avatars 210 from the bobble-head avatar library. For example, a driver may unlock new bobble-head avatars 210 when their driving behavior improves. These new bobble-head avatars 210 may be unique and/or well-known characters, such as sports heroes, sports figures, movie stars, super heroes, cartoon figures, etc. Additionally, a driver may have an option to upload a self-image for a bobble-head avatar 210.

In another aspect of the disclosure, the in-vehicle feedback system 101 may include a mounting bracket 102 or cradle to hold the in-vehicle device 101, smartphone, or tablet. As illustrated in FIGS. 2 and 3, the mounting bracket 102 may mount to the windshield at a location generally in the center and low on the windshield. The mounting bracket 102 may also mount to the dashboard of a vehicle without departing from this disclosure. The mounting bracket 102 may assist with providing a hands-free cradle for the in-vehicle device 101. The mounting bracket 102 can also provide a reminder to take the in-vehicle feedback device 101 or phone out of the driver's hands while operating the vehicle. Additionally, while in the mounting bracket 102, the text-messaging, or SMS may be disabled. Additionally, the mounting bracket 102 may stabilize the accelerometer of the in-vehicle feedback system 101. Lastly, as many physical bobble-heads are placed on dashboards, the mounting bracket 102 provides a natural position for the bobble-head avatar 101 on the graphical interface unit 240.

In another aspect of the disclosure, an application 119 or software included with or downloaded onto the in-vehicle feedback device 101 may include a coaching module. In the coaching module, a well-known actor or icon may provide driving feedback to a driver based on the recent driving behavior. For example, the driving feedback may be customized, such as, "To drive more safely: decrease your speed under the posted speed limit as speeding above the posted speed limit increases your chances for an accident by XX%," and "There are more unsafe drivers on the road between 12 am and 4 am, it is better not to drive at this time."

In another aspect of the disclosure, an application 119 or software included with or downloaded onto the in-vehicle feedback device 101 may include a customer service module. In the customer service module, advertisements may be played and directed to the drivers. Additionally, on a menu screen, the application 119 may include the ability to call a customer service agent for customer service questions. Additionally, on the menu screen, the application 119 may include the ability to easily contact a Roadside Assistance line with a one touch dialing method. Additionally, the application 119 may allow links to share and recommend the application along social media internet sites. The menu screen may also provide a link to the bobble-head avatar library screen and a link to the statistics screen.

In another aspect of the disclosure, an application 119 or software included with or downloaded onto the in-vehicle feedback device 101 may include a request quotation module. In the request quotation module, the application 119 may include the ability to call a customer service agent for insurance quotation. Additionally, the application 119 may include the ability to photo capture a vehicle identification number, also known as the "VIN" of the vehicle. The vehicle identification number may then be emailed to an insurance agent for a quick and timely quotation. The application 119 may also capture the user's email address through a sign-in/registration process. Additionally, this registration process may unlock a bobble-head avatar 210 from the bobble-head avatar library.

In another aspect of the disclosure, a bobble-head avatar gallery screen may be provided with the graphical user interface 240. The bobble-head gallery screen may provide a consolidated view of the driver's personal collection of bobble-head avatars 210. From the bobble-head avatar gallery screen, the driver may select to view the animated version of a bobble-head avatar 210 from their gallery, add a bobble-head avatar 210 from the application's pre-configured (and unlocked) collection, or choose to create their own custom bobble-head avatar 210.

In another aspect of the disclosure, an application 119 or software included with or downloaded onto the in-vehicle feedback device 101 may include a bobble-head avatar design studio module. In the bobble-head avatar design studio module, the driver can create their own bobble-head avatar 210 character selecting the head 214, body 212, and background from a predefined group of images. For the head 214, the driver may have the option to provide a custom image by taking a photo using the embedded camera or choosing a photo from a photo library with the in-vehicle feedback device 101. For the background, the driver may also have the option to provide a custom image by taking a photo using the embedded camera or choosing a photograph from a photo library with the in-vehicle feedback device 101.

In another aspect of the disclosure, an application 119 or software included with or downloaded onto the in-vehicle feedback device 101 may include the ability to receive push notifications. For example, the driver may receive alerts through push notification.

In another aspect of the disclosure, an application 119 or software included with or downloaded onto the in-vehicle feedback device 101 may include social media means. For example, the driver or user may post bobble-head avatar images and messages to a user's social media pages, such as to a Facebook Wall or Facebook Photos. Additionally, the driver or user may post bobble-head avatar images via TwitPic and corresponding Tweet to Twitter.

In another aspect of the disclosure, an application 119 or software included with or downloaded onto the in-vehicle feedback device 101 may include music integration. For example, when playing music through an in-vehicle feedback device 101, the bobble-head avatar 210 may move to the beat and/or intensity of the music. This music integration may only occur, in some embodiments, when the device 101 has been stationary for a small amount of time, such as 5 or more seconds. A triggering event or animated event may override the music integration and cause the bobble-head avatar 210 to move as discussed above for the individual animated events.

In another aspect of the disclosure, a web-based site for bobble-head avatars 210 may be provided. This web-based site would be a community website that may also receive and display bobble-head avatar images created by users. For example, when a bobble-head avatar image is posted to a social media site, the bobble-head avatar image may be simultaneously posted to this web-based site. A leader board for achievements may also be included with this web-based site.

While the invention has been described with respect to specific examples includes presently preferred modes of carrying out the invention, those skilled in the art will appreciate that there are numerous variations and permutations of the above described systems and techniques that fall within the spirit and scope of the invention.

What is claimed is:

1. A vehicle monitoring system comprising:
a battery-powered in-vehicle device, capable of being affixed to a vehicle, comprising a processor, a memory, an accelerometer, and short-range wireless communication circuitry, wherein the in-vehicle device is configured to measure acceleration data corresponding to driving data of the vehicle and store the acceleration data in the memory;
a mobile communications device wirelessly connected to the in-vehicle device through the short-range wireless communication circuitry, wherein the mobile communications device is configured to process the acceleration data to generate a real-time graphical representation of the driving data of the vehicle; and
a graphical user interface in communication with the mobile communications device, wherein the graphical user interface is configured to display, in real-time, the graphical representation of the driving data, wherein the graphical representation comprises a representation of one or more of a speed measurement, and an acceleration measurement.

2. The system of claim 1, wherein the in-vehicle device further comprises a global positioning system configured to detect a location of the vehicle over time and to send location data to the mobile communications device to associate with the driving data.

3. The system of claim 1, wherein the in-vehicle device is capable of being affixed to the vehicle without having to connect with an on-board diagnostics port of the vehicle.

4. The system of claim 1, wherein the driving data comprises events corresponding to hard braking, rapid acceleration, speeding, and fast cornering of the vehicle.

5. The system of claim 4, wherein the events corresponding to speeding occur when the in-vehicle device generates driving data exceeding a speed threshold.

6. The system of claim 1, wherein the in-vehicle device is configured to determine a trip start of the vehicle.

7. The system of claim 6, wherein the in-vehicle device is configured to communicate with an on-board diagnostics port of the vehicle.

8. The system of claim 1, wherein a trip start of the vehicle is determined based on the in-vehicle device and the mobile communications device.

9. The system of claim 1, wherein upon activation, the in-vehicle device is configured to communicate with the mobile communications device.

10. The system of claim 1, wherein the in-vehicle device further comprises a windshield mounting bracket to hold the in-vehicle device in a fixed position to the vehicle.

11. The system of claim 1, wherein the in-vehicle device is capable of being affixed to a windshield of the vehicle.

12. The system of claim 1, wherein the in-vehicle device is capable of being affixed to a dashboard of the vehicle.

13. The system of claim 1, wherein the in-vehicle device further comprises a datalogger configured to communicate with an on-board diagnostics port of the vehicle.

14. The system of claim 4, wherein the short-range wireless communication circuitry comprises a Bluetooth serial interface configured to communicate with the mobile communications device.

15. An apparatus comprising:
an in-vehicle device capable of being affixed to a windshield of a vehicle and not connected to an on-board diagnostics port of the vehicle, the in-vehicle device comprising:
a processor;
a memory;
a sensor configured to measure motion data corresponding to driving data of the vehicle; and
a short-range wireless communication circuitry;
wherein the in-vehicle device is configured to store the motion data in the memory, wherein the motion data is processed to generate the driving data comprising hard braking, rapid acceleration, speeding, and fast cornering events of the vehicle,
wherein the processor is configured to determine a trip start of the vehicle using the motion data,
wherein upon activation, the in-vehicle device is configured to:
connect, using the short-range wireless communication circuitry, to a mobile communications device, and
send the motion data to the mobile communications device to generate a graphical representation of the driving data of the vehicle.

16. The apparatus of claim 15, wherein the sensor comprises an accelerometer, and the motion data comprises acceleration data.

17. The apparatus of claim 15, wherein the sensor comprises a global positioning system configured to detect a location of the vehicle over time, wherein the short-range wireless communication circuitry is further configured to send the location of the vehicle to the mobile communications device to generate, at the mobile communications device, the driving data of the vehicle.

18. The apparatus of claim 15, wherein the in-vehicle device further comprises a battery for power, and the in-vehicle device is not connected to a power system of the vehicle.

19. An in-vehicle device comprising:
an in-vehicle device housing affixed to a windshield of a vehicle, wherein the in-vehicle device housing omits any interface to an electronic system in the vehicle;
a battery contained within the in-vehicle device housing, wherein the battery powers the in-vehicle device;
an accelerometer contained within the in-vehicle device housing, wherein the accelerometer is configured to measure acceleration data of the vehicle; and
a processor contained within the in-vehicle device housing, wherein the processor is configured to determine a trip start of the vehicle based on the acceleration data;
a memory contained within the in-vehicle device housing, wherein the memory is configured to store the acceleration data; and
a short-range wireless communication circuitry contained within the in-vehicle device housing, wherein the in-vehicle device is configured to connect with Bluetooth, using the short-range wireless communication circuitry, to a mobile communications device and then to send the acceleration data to the mobile communications device to generate a graphical representation of driving data of the vehicle.

20. The system of claim 1, further comprising:
a remote processing server located remote from the vehicle and configured to receive the driving data, wherein the driving data is associated with the mobile communications device.

21. The system of claim 1, wherein the in-vehicle device is integrated into the mobile communications device.

22. The system of claim 1, wherein the graphical user interface is integrated into the mobile communications device or a vehicle dashboard of the vehicle.

* * * * *